United States Patent [19]

Otouma et al.

[11] 3,967,043

[45] June 29, 1976

[54] ASBESTOS ARTICLES HAVING DUSTPROOF PROPERTIES

[75] Inventors: Takashi Otouma, Yokohama; Michio Nakamura, Odawara, both of Japan

[73] Assignee: Nippon Asbestos Company, Ltd., Tokyo, Japan

[22] Filed: Jan. 3, 1974

[21] Appl. No.: 430,590

[30] Foreign Application Priority Data

Mar. 26, 1973 Japan.............................. 48-34299

[52] U.S. Cl................................ 428/443; 428/524
[51] Int. Cl.$^2$......................................... B32B 19/02
[58] Field of Search....... 117/126 AB, 62.2, DIG. 3, 117/126 AQ; 428/443, 271, 290, 375; 427/340, 341, 342; 260/14

[56] References Cited
UNITED STATES PATENTS

| 941,605 | 11/1909 | Baekland.......................... 117/161 L |
| 1,111,286 | 9/1914 | Aylsworth........................ 117/161 L |
| 2,190,672 | 2/1940 | Meharg............................ 117/DIG. 3 |
| 2,249,514 | 7/1941 | Berg et al. ...................... 117/139 X |
| 2,318,560 | 5/1943 | Ripper............................. 117/126 AB |
| 2,534,818 | 12/1950 | Holroyd et al. ............... 117/126 AB |
| 2,774,687 | 12/1956 | Nottebohm et al. ......... 117/161 L X |
| 3,415,674 | 12/1968 | Voisinet .................. 117/126 AB X |
| 3,542,706 | 11/1970 | Columbus et al..................... 260/14 |
| 3,660,148 | 5/1972 | Heron........................... 117/126 AB |

*Primary Examiner*—Ronald H. Smith
*Assistant Examiner*—Evan K. Lawrence
*Attorney, Agent, or Firm*—Browdy and Neimark

[57] ABSTRACT

A method of preparing asbestos articles to exhibit dustproof effects in secondary processing without degradation of the inherent properties of the asbestos articles comprises the step of immersing the asbestos article in a treating agent comprising formaldehyde, a water-soluble organic compound capable of reacting with formaldehyde to form a water-insoluble compound under weakly alkaline conditions in an atmosphere maintained at a high temperature and a high humidity, a plasticizer, and a water-soluble macromolecular substance having film forming properties, and the steps of infusing the asbestos article with a weakly alkaline solution and first reacting the asbestos article in an atmosphere maintained at a high temperature and high humidity, and subsequently heat treating the resulting product to obtain the final product. The final product is impregnated in the interior substrate thereof by 0.5 to 10 wt.% of the water-insoluble compound, has a surface layer of 0.04 to 0.09 wt.% of a film of the water-soluble macromolecular substance, and has 1.5-30 wt.% of a polyhydric alcohol plasticizer.

2 Claims, 1 Drawing Figure

ASBESTOS ARTICLES HAVING DUSTPROOF PROPERTIES

FIELD OF THE INVENTION

The present invention relates to a method of preparing and treating asbestos articles to exhibit dustproof properties in secondary processing, particularly spun and woven asbestos articles, by treating such articles with a treating agent without degradation of the inherent asbestos properties of the articles.

BACKGROUND OF THE INVENTION

Emulsions, dispersions or solutions containing macromolecular substances have heretofore been used for imparting dustproof properties to asbestos articles. According to conventional techniques, such treating agents are impregnated into the interior substrate and/or onto the surface portions of an asbestos article and then the dispersion medium or solvent is removed by drying, thereby leaving a film of the macromolecular substance contained in the treating agent. Since in the secondary processing of asbestos articles they are subjected to cutting and other processing operations, it is essential that the dustproof properties be imparted uniformly to not only the surface portions but also the interior substrate of asbestos articles. However, in conventional techniques, the dispersed substance or solute tends to gather on the surface portions of an asbestos article at the drying step, thus the distribution density is frequently lower in the interior substrate portion of the article. Consequently, optimal dustproof effects cannot be obtained using conventional techniques.

BRIEF SUMMARY OF THE INVENTION

This invention provides a method which overcomes the above mentioned defects in conventional techniques by imparting dustproof properties uniformly to not only the surface portions but also the interior substrate portion of an asbestos article without the degradation of its inherent asbestos properties. The treating agent used in this invention is one prepared by forming a mixture of formaldehyde with a water-soluble organic compound capable of both being aged under weakly alkaline conditions in an atmosphere maintained at a high temperature and a high humidity and reacting with formaldehyde to form a water-insoluble compound, adding a plasticizer such as a polyhydric alcohol or any other liquid alcohol having a high molecular weight, and finally incorporating a water-soluble macromolecular substance having film-forming properties into the resulting mixture. An asbestos article to be treated, hereinafter referred to as a "starting article," such as a spun or woven article of asbestos in the form of cloth, tape, rope or the like, is immersed in this treating agent in order to impregnate the starting article with the treating agent. Then the resulting product is first aged with a weakly alkaline substance in an atmosphere maintained at a high temperature and a high humidity, and subsequently subjected to heat treatment and dried.

DETAILED DESCRIPTION

Figure 1:
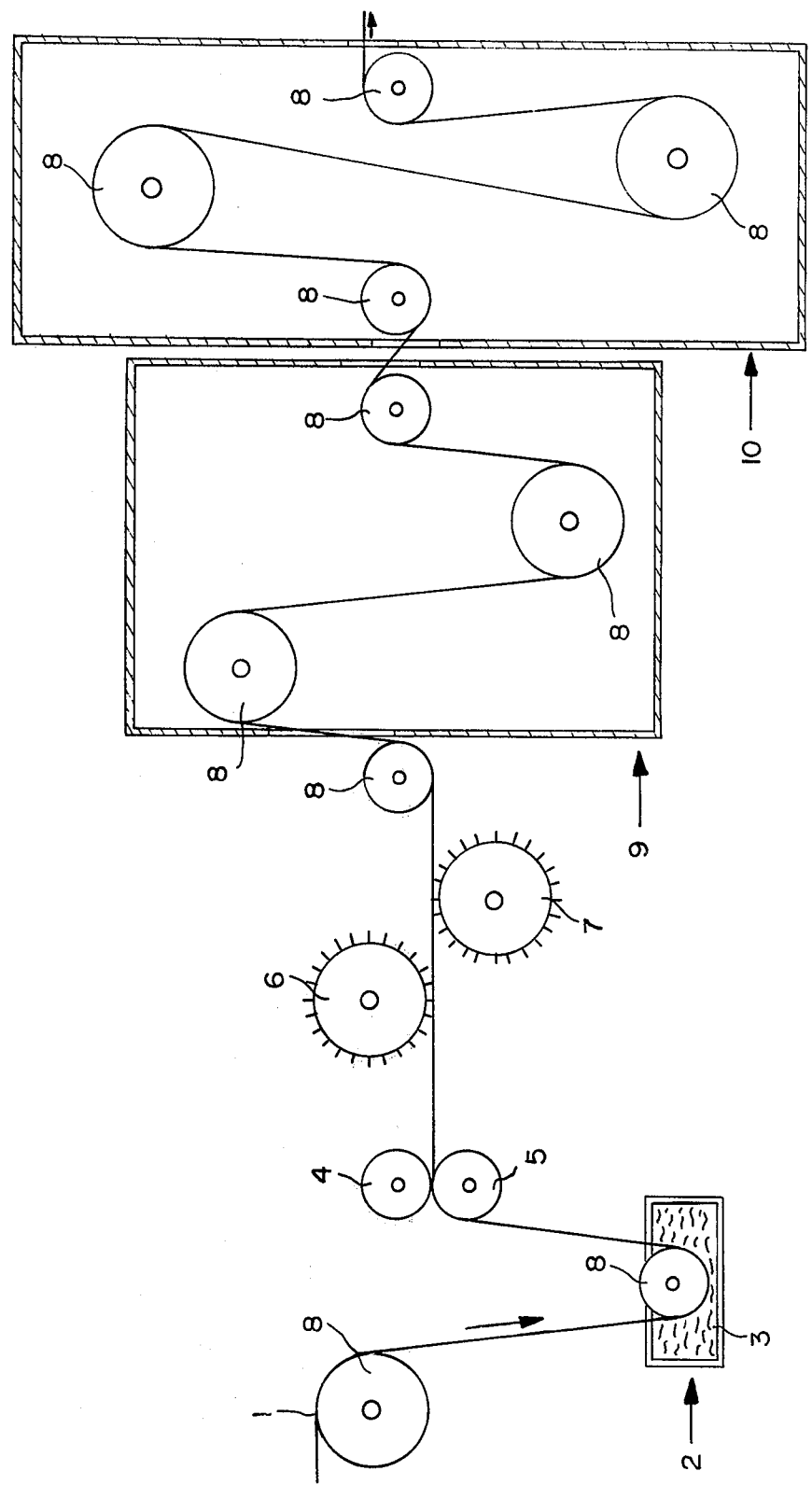
FIG. 1 is a schematic diagram of an apparatus employed in carrying out the method of this invention.

The product formed in accordance with the method of this invention is hereinafter referred to as the "complete product." Because the treating agent used in the present invention is impregnated through the entire starting asbestos article and close adhesion and bonding among asbestos fibers in the asbestos article is obtained in the aging and heat treatment steps, the amounts of each ingredient in the treating agent is defined based on the weight of the dried complete product.

The complete product comprises 1.5 to 30 wt.% of said polyhydric alcohol or other high-molecular-weight alcohol, 0.04 to 0.09 wt.% of the water-soluble macromolecular substance having film-forming properties which is uniformly distributed through the surface layer, and 0.5 to 10 wt.% of the water-insoluble compound formed during the heat treatment and aging steps which is distributed through the interior of the complete product. The treating agent to be used in this invention may further comprise methanol as a stabilizer for an aqueous solution of formaldehyde. If the amount of polyhydric alcohol or other high-molecular-weight alcohol, the plasticizer, is less than 1.5 wt.%, plasticizing effects in the asbestos article cannot be obtained, and if the amount of the plasticizer exceeds 30 wt.%, the plasticizer, a liquid substance, will ooze out when the asbestos article is pressed by fingers or the like. If the amount of the water-soluble macromolecular substance to be used as the film-forming substance is less than 0.04 wt.%, the resulting dust-proof effects are too low, and if the amount of this substance exceeds 0.09 wt.%, the surface layer of the asbestos article becomes too readily combustible. In this invention, the content of the water-insoluble substance formed by the reaction between the water soluble organic compound and formaldehyde is limited to a range of from 0.5 to 10 wt.% because at a content below 0.05 wt.% the dustproof effects are too low and at a content exceeding 10 wt.% the complete product becomes too hard to work in the subsequent secondary processing.

Some examples of treating agents employed in the method of this invention are set forth below:

Example 1

| | |
|---|---|
| Melamine (15% aqueous solution) | 50 parts |
| Formaldehyde (20% aqueous solution) | 50 parts |
| Glycerin plasticizer | 3 parts |
| Polyethyleneoxide water-soluble macromolecular substance (0.5% aqueous solution) | 10 parts |
| Methanol | 1 part |
| Total | 114 parts |

Example 2

| | |
|---|---|
| Urea (10% aqueous solution) | 50 parts |
| Formaldehyde (20% aqueous solution) | 50 parts |
| Ethylene glycol plasticizer | 5 parts |
| Polyvinyl alcohol water-soluble macromolecular substance (0.5% aqueous solution) | 10 parts |
| Methanol | 2 parts |
| Total | 117 parts |

Example 3

| | |
|---|---|
| Urea (25% aqueous solution) | 50 parts |
| Formaldehyde (38% aqueous solution) | 50 parts |
| Glycerin plasticizer | 5 parts |
| Polyethyleneoxide water soluble macromolecular substance (0.5% aqueous solution) | 10 parts |
| Methanol | 4 parts |
| Total | 119 parts |

Example 4

| | |
|---|---|
| Phenol (10% aqueous solution) | 40 parts |

-continued

| | |
|---|---|
| Formaldehyde (20% aqueous solution) | 40 parts |
| Glycerin plasticizer | 40 parts |
| Methyl cellulose water-soluble macromolecular plasticizer (1% aqueous solution) | 10 parts |
| Methanol | 2 parts |
| Total | 132 parts |

Example 5

| | |
|---|---|
| Aqueous solution of phenol prepolymer (average molecular weight — 200; concentration — 60% | 1 part |
| Formaldehyde (5% aqueous solution) | 1 part |
| Glycerin plasticizer | 3 parts |
| Polyethyleneoxide water-soluble macromolecular substance (0.5% aqueous solution) | 10 parts |
| Water | 85 parts |
| Total | 100 parts |

The method of the present invention can be illustrated with reference to FIG. 1; guide rollers of varying diameters are connoted by reference number 8. A starting article 1 is passed through a treating bath 2 containing treating agent 3 to impregnate the starting article with the treating agent. The impregnated article is forwarded through squeeze rolls 4 and 5 where excess treating agent is removed so that the weight of the impregnated article is 2.1 to 2.2 times the weight of the starting article. Then, the impregnated article is brushed by means of brushing rolls 6 and 7 to infuse a water-soluble alkaline component through the asbestos article and into the treating agent impregnated in the starting asbestos article in order to attain the weakly alkaline conditions (pH 8~11) necessary for the reaction of the reactive substances in the treating agent. During this brushing treatment, the impregnated asbestos article is also squeezed by the brushing rolls so that the weight of the impregnated article is about 2 times the weight of the starting article. Then, the aging step is conducted for 15 to 20 minutes in an aging tank 9 filled with high humidity conditions (R.H. 20%~100%) at 70°C~100°C. The article coming from the aging tank is heat-treated and dried in a drying furnace 10 maintained at about 70°C~150°C. This results in a complete product which comprises 1.5 to 30 wt.% of the polyhydric alcohol or other high molecular-weight alcohol as the plasticizer, 0.04 to 0.09 wt.% of the water-soluble macromolecular substance having film-forming properties uniformly distributed in the surface layer and 0.05 to 10 wt.% of the water-insoluble compound distributed through the interior of the complete product and formed by the above aging and heat treatment steps. In the foregoing example the brushing treatment is adapted to attain weakly alkaline conditions, but means for attaining weakly alkaline conditions are not limited to a brushing step and it is possible to add an alkaline substance such as aqueous ammonia or a dilute solution of sodium hydroxide by some other suitable means.

The water-soluble organic substance such as melamine, urea, phenol and phenol prepolymer used in the above examples 1–5 is fixed and bonded to the surface of the asbestos fibers in the aging tank 9 and reacts with formaldehyde to form a water-insoluble resinous compound. This reaction proceeds and is completed in the drying furnace 10. The water-insoluble compound formed by this reaction acts as a dust-proofing binder bonding asbestos fibers to one another in the interior of the asbestos article. The water-soluble macromolecular substance such as polyethyleneoxide, polyvinyl alcohol or methyl cellulose forms a film on the surface layer of the starting article at the drying step and thus exhibits dust-proof effects. Furthermore, since the polyhydric or other high-molecular-weight alcohol such as glycerin or ethylene glycol is distributed through the interior of the starting article as a liquid plasticizer, despite the above-mentioned bonding activity and film-forming activity brought about in the interior and the surface layers of the asbestos article, the flexibility is not lost in the complete product.

In order to know the dustproof effects of the complete product made in accordance with this invention, tests were conducted in the following manner using products made with the treating agents of the above Examples 1 to 5. A film filter is connected to a suction pump and the sucking rate is adjusted to 200 cc/min. The sample is cut with scissors at the same height as the filter and about 30 cm from the filter. Asbestos fiber dust formed by the cutting step is collected by the filter. The collected dust particles are fixed on the filter film by use of a fixing agent, and after the filter film is made transparent by use of a chemical, the filter film is observed under a phase-contrast microscope. The number of particles having a length greater than 5 µ is counted and the number of asbestos dust particles per cc of air is calculated. Results are shown in the following Table:

Table 1

| | Number of asbestos dust particles per cc of Air | Flexibility | Appearance |
|---|---|---|---|
| Untreated Article | 30 | good | good |
| Product of Example 1 | 1.2 | good | good |
| Product of Example 2 | 1.3 | good | good |
| Product of Example 3 | 0.9 | slightly inferior | slightly colored |
| Product of Example 4 | 1.2 | good | slightly colored |
| Product of Example 5 | 1.3 | good | good |

As is indicated by the results from the foregoing Table, in the complete product of this invention, surfaces of interior asbestos fibers are covered with the water-soluble resinous compound and these fibers are bonded tightly to one another by such water-insoluble resinous compound. Furthermore, a film is formed on the surface layer of the asbestos article. Accordingly, in the complete product of this invention, the dustproof effects are attained in not only the interior but also the outer portions and these effects are very high. Moreover, although the interior and outer portions of the asbestos article are in the coated state, flexibility is imparted to the complete product by the presence of the plasticizer and therefore, the inherent flexibility of the asbestos article is not lost in the complete product of this invention.

The foregoing description of this invention will so fully reveal the general nature of the invention that others can, by applying current knowledge, readily modify such invention and/or vary it without departing from the generic concept, and, therefore, such variations and modifications should and are intended to be comprehended within the meaning and range of equivalents of the disclosed invention. It is to be understood that the phraseology or terminology employed herein is for the purposes of description and not of limitation.

What is claimed is:

1. An asbestos product which exhibits dustproof effects comprising an asbestos article impregnated in the interior substrate thereof by the reaction product of formaldehyde and a water-soluble organic compound reacted therewith to form a water-insoluble compound under weakly alkaline conditions in an atmosphere maintained at a high temperature and a high humidity, said reaction product being present in an amount of 0.05 to 10 wt.% based on the total weight of the asbestos product, said asbestos product having a surface layer of 0.04 to 0.09 wt.% based on the weight of the said asbestos product of a film of a water-soluble macromolecular substance, said asbestos product having 1.5 – 30wt. % based on the weight of the asbestos product of a polyhydric alcohol plasticizer therein.

2. The asbestos product in accordance with claim 1 wherein said water-soluble organic compound is melamine, urea, phenol or phenol prepolymer, and said water-soluble macromolecular substance is polyethyleneoxide, polyvinyl alcohol or methyl cellulose.

* * * * *